US012767832B2

(12) United States Patent
Hiratani et al.

(10) Patent No.: US 12,767,832 B2
(45) Date of Patent: Oct. 20, 2026

(54) CURABLE RESIN COMPOSITION, CURED PRODUCT AND MANUFACTURING METHOD OF ARTICLE

(71) Applicant: CANON KABUSHIKI KAISHA, Tokyo (JP)

(72) Inventors: Takayuki Hiratani, Tokyo (JP); Kyohei Wada, Tokyo (JP); Ryo Ogawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 18/660,856

(22) Filed: May 10, 2024

(65) Prior Publication Data

US 2024/0384106 A1 Nov. 21, 2024

(30) Foreign Application Priority Data

May 16, 2023 (JP) ................................ 2023-081020
Apr. 25, 2024 (JP) ................................ 2024-071465

(51) Int. Cl.
*C09D 4/00* (2006.01)
*B33Y 70/00* (2020.01)
(Continued)

(52) U.S. Cl.
CPC ................ *C09D 4/00* (2013.01); *B33Y 70/00* (2014.12); *C09D 151/08* (2013.01); (Continued)

(58) Field of Classification Search
CPC combination set(s) only.
See application file for complete search history.

(56) References Cited

U.S. PATENT DOCUMENTS

2021/0130523 A1* 5/2021 Sugimoto ........... C08F 290/048
2021/0230341 A1* 7/2021 Hiratani ................. B33Y 40/20
2024/0384106 A1* 11/2024 Hiratani ................. B33Y 80/00

FOREIGN PATENT DOCUMENTS

JP 2004051665 A 2/2004
JP 2012241096 A 12/2012
(Continued)

OTHER PUBLICATIONS

Hansen Solubility Parameters, CRC Press, second edition, 2007, selected pages (Year: 2007).*
Acroyloylmorpholine TCI Chemicals (Year: 2026).*

*Primary Examiner* — Peter A Salamon
(74) *Attorney, Agent, or Firm* — Canon U.S.A., Inc. IP Division

(57) ABSTRACT

A curable resin composition includes a multifunctional radical polymerizable compound (A), a monofunctional radical polymerizable compound (B), a rubber particle (C), and a radical polymerization initiator (D). The compound (A) includes a multifunctional urethane (meth)acrylate oligomer (a1) in a certain amount based on the total amount of the compounds (A) and (B). The compound (A) and/or (B) contains at least one radical polymerizable compound satisfying expressions (1) to (3) in a certain amount based on the total amount of the compounds (A) and (B). The compound satisfies the expressions (1) to (3) and is a compound other than the oligomer (a1): log(S)≤0.4 (1), 3.0≤δP value≤6.0 (2), molecular weight≤500 (3), log(S) is a common logarithm of solubility in water at 25° C., and δP value is a value of dipole interaction energy in Hansen solubility parameter.

18 Claims, 1 Drawing Sheet

(51) Int. Cl.
*C09D 151/08* (2006.01)
*B29C 64/129* (2017.01)
*B29C 64/30* (2017.01)
*B29K 33/00* (2006.01)
*B29K 105/00* (2006.01)
*B29K 105/16* (2006.01)
*B29K 275/00* (2006.01)
*B33Y 10/00* (2015.01)
*B33Y 40/20* (2020.01)

(52) U.S. Cl.
CPC ............ *B29C 64/129* (2017.08); *B29C 64/30* (2017.08); *B29K 2033/26* (2013.01); *B29K 2105/0094* (2013.01); *B29K 2105/16* (2013.01); *B29K 2105/251* (2013.01); *B29K 2275/00* (2013.01); *B29K 2995/0068* (2013.01); *B29K 2995/0089* (2013.01); *B33Y 10/00* (2014.12); *B33Y 40/20* (2020.01)

(56) References Cited

FOREIGN PATENT DOCUMENTS

| | | | | |
|---|---|---|---|---|
| JP | 2019156932 | A | | 9/2019 |
| JP | 2020200437 | A | | 12/2020 |
| JP | 2021084321 | A | | 6/2021 |
| JP | 2022083414 | A | * | 6/2022 |

* cited by examiner

CURABLE RESIN COMPOSITION, CURED PRODUCT AND MANUFACTURING METHOD OF ARTICLE

BACKGROUND

Field

The present disclosure relates to a curable resin composition, a cured product, and a method for manufacturing an article.

Description of the Related Art

An optical three-dimensional shaping method (hereinafter, referred to as “stereolithography”) of producing a shaped object composed of integrally laminated cured resin layers by repeating a step of forming the cured resin layer by selectively irradiating a photocurable resin composition with light based on the three-dimensional shape of a three-dimensional model is known.

Specifically, according to slice data generated from three-dimensional shape data of the three-dimensional model to be produced, the liquid surface of a photocurable resin composition in a liquid state accommodated in a container is irradiated with light to form a cured resin layer having a desired pattern at a predetermined thickness. Subsequently, a photocurable resin composition is supplied on this cured resin layer and is similarly irradiated with light to laminate and form a new cured resin layer bonded to the previously formed cured resin layer. A desired three-dimensional shaped object can be thus obtained by laminating cured resin layers with a pattern based on slice data. According to such a stereolithography, it becomes possible to easily produce a three-dimensional object, even if it has a complex shape, as long as there are three-dimensional shape data of the three-dimensional model.

The stereolithography is increasingly being applied to shaping of a prototype for confirmation of the shape (rapid prototyping) and shaping of a working model for functionality verification or shaping of a model (rapid tooling). Furthermore, in recent years, the use of stereolithography is beginning to expand also to shaping of actual products (rapid manufacturing).

Based on this background, there is a need for a photocurable resin composition that can be shaped into a three-dimensional shaped object having high impact resistance comparable to general-purpose engineering plastics. Furthermore, in addition to the above, there is a need for low water absorbency to show high dimensional stability even in high humidity environments.

Japanese Patent Laid-Open No. 2004-51665 (PTL 1) and Japanese Patent Laid-Open No. 2019-156932 (PTL 2) disclose resin compositions for optical three-dimensional shaping containing urethane (meth)acrylate, an ethylenically unsaturated compound having a radical polymerizable group, a rubber particle, and a radical polymerization initiator. In PTL 1 and PTL 2, improvement in the impact resistance by using a combination of urethane (meth)acrylate having a flexible structure and a rubber particle has been investigated.

However, the addition of urethane (meth)acrylate and a rubber particle effective for improvement of impact resistance causes a significant increase in the viscosity of the resin composition. Accordingly, it is difficult to keep the viscosity of the resin composition low and to apply high impact resistance to the cured product thereof. For example, in PTL 1, although the content of urethane (meth)acrylate in the resin composition is relatively high, it is necessary to keep the amount of the rubber particle relatively low so as not to impair workability during the production of a cured product, and the impact resistance of the cured product is therefore insufficient. In PTL 2, since the contents of both of urethane (meth)acrylate and a rubber particle are kept low, although the workability during the production of a cured product is excellent, the impact resistance thereof is low.

SUMMARY

The present disclosure provides a curable resin composition with low viscosity that can form a cured product having excellent impact resistance and low water absorbency.

The curable resin composition of the present disclosure includes a multifunctional radical polymerizable compound (A), a monofunctional radical polymerizable compound (B), a rubber particle (C), and a radical polymerization initiator (D), wherein the multifunctional radical polymerizable compound (A) includes a multifunctional urethane (meth)acrylate oligomer (a1) in an amount of 25 parts by mass or more and 60 parts by mass or less based on 100 parts by mass of the total amount of the multifunctional radical polymerizable compound (A) and the monofunctional radical polymerizable compound (B), at least one of the multifunctional radical polymerizable compound (A) or the monofunctional radical polymerizable compound (B) contains at least one radical polymerizable compound satisfying expressions (1) to (3) below in an amount of 2 parts by mass or more and 75 parts by mass or less based on 100 parts by mass of the total amount of the multifunctional radical polymerizable compound (A) and the monofunctional radical polymerizable compound (B), and the radical polymerizable compound satisfying the expressions (1) to (3) is a radical polymerizable compound other than the multifunctional urethane (meth)acrylate oligomer (a1), $\log(S) \leq 0.4$ (1), $3.0 \leq \delta P$ value$\leq 6.0$ (2), and molecular weight$\leq 500$ (3), wherein log(S) is a common logarithm of solubility in water at 25° C., and δP value is a value of dipole interaction energy in Hansen solubility parameter.

Further features of the present disclosure will become apparent from the following description of exemplary embodiments (with reference to the attached drawings).

DESCRIPTION OF THE EMBODIMENTS

Figure 1:
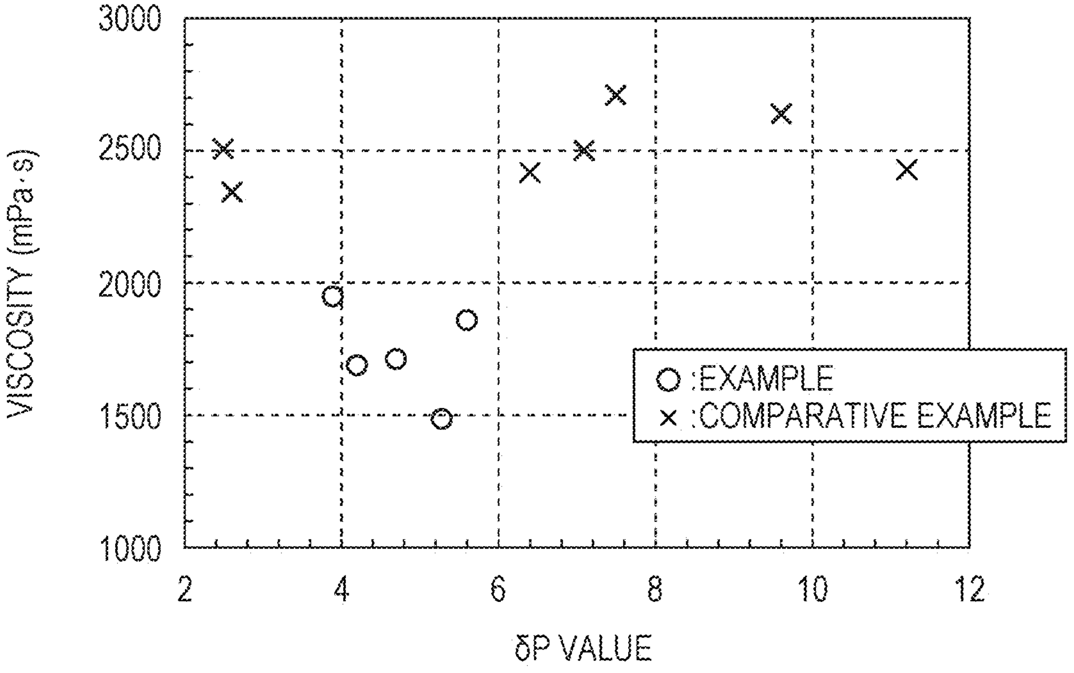
FIG. 1 is a graph showing a relationship between the δP value of the radical polymerizable compounds used in Examples and the viscosity of the curable resin compositions.

Embodiments of the present disclosure (hereinafter, also referred to as “this embodiment”) will now be described. The embodiments described below are merely examples of embodiments, and the present disclosure is not limited to these embodiments.

In order to obtain a cured product with excellent impact resistance containing urethane (meth)acrylate and a rubber particle, it has been necessary to use a resin composition with high contents of both. However, such a resin composition has a high viscosity to cause a reduction in the workability during the production of a cured product, and is therefore difficult to be suitably used in shaping of a three-dimensional shaped object.

The present inventors conducted extensive studies for solving such disadvantages. As a result, it was found that a curable resin composition that has a low viscosity suitable for three-dimensional shaping and can form a cured product having excellent impact resistance and low water absorbency is obtained by adding a hydrophobic radical polymerizable compound having a Hansen solubility parameter within a specific numerical value range and a molecular weight in a certain range or less to a resin composition containing a urethane (meth)acrylate oligomer and a rubber particle.

Specifically, it was found that addition of a radical polymerizable compound satisfying the expression (1) to (3) below to a resin composition containing a urethane (meth)acrylated oligomer and a rubber particle is effective for achieving both low viscosity of the resin composition and high impact resistance of a cured product.

$$\log(S) \leq 0.4 \quad (1)$$

$$3.0 \leq \delta P \text{ value} \leq 6.0 \quad (2)$$

$$\text{Molecular weight} \leq 500 \quad (3)$$

log(S): common logarithm of solubility in water at 25° C., and

δP value: value of dipole interaction energy in Hansen solubility parameter.

Accordingly, a major feature of the curable resin composition according to the present disclosure is that it contains a radical polymerizable compound satisfying the expressions (1) to (3) above, in addition to a multifunctional urethane (meth)acrylate oligomer and a rubber particle.

A multifunctional radical polymerizable compound (A), a monofunctional radical polymerizable compound (B), a rubber particle (C), a radical polymerization initiator (D), and a resin composition will now be described in detail with reference to embodiments. Hereinafter, the multifunctional radical polymerizable compound (A) and the monofunctional radical polymerizable compound (B) may be simply referred to as "compound (A)" and "compound (B)", respectively.

Multifunctional Radical Polymerizable Compound (A)

The multifunctional radical polymerizable compound (A) in the curable resin composition of the present disclosure can be also a compound having at least two radical polymerizable functional groups in its molecule.

Examples of the radical polymerizable functional group include an ethylenically unsaturated group. Concrete examples of the ethylenically unsaturated group include a (meth)acryloyl group and a vinyl group. In a compound in which two ethylenically unsaturated groups in a molecule are cyclopolymerized, the two ethylenically unsaturated groups in a molecule to be cyclopolymerized are defined as one radical polymerizable functional group. In this specification, the term "(meth)acryloyl group" means an acryloyl group or a methacryloyl group.

Multifunctional Urethane (Meth)Acrylate Oligomer (a1)

The curable resin composition contains, as the compound (A), a multifunctional urethane (meth)acrylate oligomer (a1). Hereinafter, the multifunctional urethane (meth)acrylate oligomer (a1) may be simply referred to as "compound (a1)". Specifically, the compound (a1) is a compound having at least two (meth)acryloyl groups and at least two urethane groups in its molecule.

The content of the compound (a1) is 25 parts by mass or more and 60 parts by mass or less based on 100 parts by mass of the total amount of the compound (A) and the compound (B), and is preferably 28 parts by mass or more and 55 parts by mass or less, more preferably 30 parts by mass or more and 50 parts by mass or less. When the content of the multifunctional urethane (meth)acrylate oligomer (a1) is within the above range, it is possible to achieve both low viscosity of the resin composition and high impact resistance of a cured product. When the content of the multifunctional urethane (meth)acrylate oligomer (a1) is lower than 25 parts by mass, the impact resistance decreases, and at the same time, the interaction between molecules of the compound (a1) decreases. Accordingly, it is difficult to obtain an effect of reducing the viscosity of the resin composition by the addition of a radical polymerizable compound satisfying the expressions (1) to (3). In contrast, when the content of the compound (a1) is 25 parts by mass or more, since the interaction between molecules of the compound (a1) through interlocking increases, the addition of a compound satisfying the expressions (1) to (3) is an extremely effective means for decreasing the viscosity by weakening the interaction. When the content of the compound (a1) is higher than 60 parts by mass, although the viscosity-decreasing effect by the addition of a compound satisfying the expressions (1) to (3) is still effective, the increase in the viscosity of the resin composition becomes significant, and it becomes difficult to suitably use the composition as a shaping material in stereolithography.

As the multifunctional urethane (meth)acrylate oligomer (a1), for example, the compounds x) to z) below can be used. In particular, from the viewpoint of being capable of realizing high impact resistance, the compound z) may be used.

x) a compound obtained by reaction of a hydroxy group-containing (meth)acrylate compound and a multivalent isocyanate compound;

y) a compound obtained by reaction of an isocyanate group-containing (meth)acrylate compound and a polyol compound; and z) a compound obtained by reaction of a polyurethane having a plurality of isocyanate group, which has been obtained by reaction of a multivalent isocyanate compound and a polyol compound, and a hydroxy group-containing (meth)acrylate compound.

Examples of the hydroxy group-containing (meth)acrylate compound include hydroxyalkyl (meth)acrylates, such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate; 2-hydroxyethyl acryloyl phosphate, 2-(meth)acryloyloxyethyl-2-hydroxypropyl phthalate, caprolactone-modified 2-hydroxyethyl (meth)acrylate, dipropylene glycol (meth)acrylate, fatty acid-modified-glycidyl (meth)acrylate, polyethylene glycol mono(meth)acrylate, polypropylene glycol mono (meth)acrylate, 2-hydroxy-3-(meth)acryloyloxypropyl (meth)acrylate, glycerin di(meth)acrylate, 2-hydroxy-3-acryloyl-oxypropyl methacrylate, pentaerythritol tri(meth) acrylate, caprolactone-modified pentaerythritol tri(meth) acrylate, ethylene oxide-modified pentaerythritol tri(meth) acrylate, dipentaerythritol penta(meth)acrylate, caprolactone-modified dipentaerythritol penta(meth)acrylate, and ethylene oxide-modified dipentaerythritol penta (meth)acrylate. These hydroxy group-containing (meth) acrylate compounds may be used alone or in combination of two or more thereof.

Examples of the multivalent isocyanate compound include aromatic polyisocyanates such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate; aliphatic polyisocyanates such as pentamethylene diisocyanate, hexamethylene diisocyanate, trimethylhexamethylene diisocyanate, lysine diisocyanate, and lysine triisocyanate; alicyclic polyisocyanates such as hydrogenated diphenylmethane diisocyanate, hydrogenated xylylene diisocyanate, isophorone diisocyanate, norbornene diisocyanate, and 1,3-bis(isocyanatomethyl)cyclohexane; and trimeric or multimeric compounds of these polyisocyanates, allophanate-type polyisocyanate, bullet-type polyisocyanate, and water-dispersible polyisocyanate. These multivalent isocyanate compounds may be used alone or in combination of two or more thereof.

Examples of the isocyanate group-containing (meth)acrylate compound include 2-isocyanatoethyl acrylate, 2-isocyanatoethyl methacrylate, 1,1-(bisacryloyloxymethyl)ethyl isocyanate, and 2-(2-methacryloyloxyethyloxy)ethylisocyanate.

Examples of the polyol compound include polycarbonate polyol, polyester polyol, polyether polyol, polyolefin polyol, polybutadiene polyol, (meth)acrylic polyol, and polysiloxane polyol. In particular, from the viewpoint of being capable of achieving both high impact resistance and high elasticity module, polycarbonate polyol or polyester polyol may be used, and polycarbonate polyol may be used. These polyol compounds may be used alone or in combination of two or more thereof.

Examples of the polycarbonate polyol include reaction products of a polyhydric alcohol and a phosgene and a ring-opening polymer of a cyclic carbonate (such as alkylene carbonate). The polycarbonate polyol may be a compound having a carbonate bond in its molecule and having a hydroxyl group at the terminal and may have an ester bond in addition to the carbonate bond.

Examples of the polyhydric alcohol include ethylene glycol, diethylene glycol, propylene glycol, dipropylene glycol, trimethylene glycol, 1,4-tetramethylene diol, 1,3-tetramethylene diol, 2-methyl-1,3-trimethylene diol, 1,5-pentamethylene diol, neopentyl glycol, 1,6-hexamethylene diol, 3-methyl-1,5-pentamethylene diol, 2,4-diethyl-1,5-pentamethylene diol, glycerin, trimethylolpropane, trimethylolethane, cyclohexane diols (such as 1,4-cyclohexane diol), bisphenols (such as bisphenol A), and sugar alcohols (such as xylitol and sorbitol).

Examples of the alkylene carbonate include ethylene carbonate, trimethylene carbonate, tetramethylene carbonate, and hexamethylene carbonate.

Examples of the polyester polyol include condensation polymers of a polyhydric alcohol and a polycarboxylic acid, ring-opening polymers of a cyclic ester (lactone), and reaction products of three components of a polyhydric alcohol, a polycarboxylic acid, and a cyclic ester.

Examples of the polyhydric alcohol include polyhydric alcohols exemplified in the explanation of the polycarbonate polyol.

Examples of the polycarboxylic acid include aliphatic dicarboxylic acids, such as malonic acid, maleic acid, fumaric acid, succinic acid, glutaric acid, adipic acid, suberic acid, azelaic acid, sebacic acid, and dodecanedioic acid; alicyclic dicarboxylic acids, such as 1,4-cyclohexanedicarboxylic acid; and aromatic dicarboxylic acids, such as terephthalic acid, isophthalic acid, orthophthalic acid, 2,6-naphthalenedicarboxylic acid, paraphenylenedicarboxylic acid, and trimellitic acid.

Examples of the cyclic ester include propiolactone, β-methyl-8-valerolactone, and ε-caprolactone.

The polycarbonate polyol and the polyester polyol may have, from the viewpoint of a high effect of decreasing the viscosity of a resin composition by containing a radical polymerizable compound satisfying the expressions (1) to (3), structures represented by the following general formula (i) and (ii), respectively.

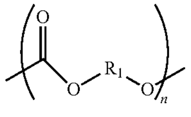

(i)

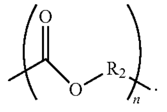

(ii)

$R_1$ and $R_2$ in the general formulae (i) and (ii) are each independently a hydrocarbon group including an alkylene group having 1 or more and 18 or less carbon atoms, and n is 2 or more and 50 or less. $R_1$ and $R_2$ may be hydrocarbon groups including an alkylene group having 4 or more and 9 or less carbon atoms. $R_1$ and $R_2$ are, for example, one or a combination of two or more selected from the group consisting of $—(CH_2)_m—$ (m is 1 or more and 18 or less), $—(CH_2)C(CH_3)_2(CH_2)_l—$ (h is 0 or more and 5 or less, I is 0 or more and 15 or less), and $—(CH_2)_jCH(CH_3)(CH_2)_k—$ (j is 0 or more and 16 or less, k is 0 or more and 16 or less). In particular, $R_1$ and $R_2$ may each include $—(CH_2)_m—$ (m is 4 or more and 9 or less). $R_1$ and $R_2$ may include an aromatic hydrocarbon group in addition to an alkylene group.

Examples of the polyether polyol include alkylene structure-containing polyether polyols, such as polyethylene glycol, polypropylene glycol, polytetramethylene glycol, and polyhexamethylene glycol; and random or block copolymers of these polyalkylene glycols. In particular, from the viewpoint of a high effect of decreasing the viscosity of a resin composition by containing a polymerizable compound satisfying the expressions (1) to (3), at least one selected from polypropylene glycol, polytetramethylene glycol, and polyhexamethylene glycol may be contained, and polypropylene glycol or polytetramethylene glycol may be contained.

The weight-average molecular weight of the multifunctional urethane (meth)acrylate oligomer (a1) is preferably 1,000 or more and 60,000 or less and more preferably 2,000 or more and 50,000 or less. When the weight-average molecular weight is 1,000 or more, the impact resistance of a cured product tends to significantly increase as the cross-link density decreases. When the weight-average molecular weight is higher than 60,000, a reduction in the workability during the production of a cured product tends to be caused by an increase in the viscosity of the resin composition due to the addition.

The weight-average molecular weight (Mw) of the multifunctional urethane (meth)acrylate oligomer (a1) is weight-average molecular weight by standard polystyrene molecular weight conversion and is measured using two columns: Shodex GPC LF-804 (molecular weight exclusion limit: $2\times10^6$, separation range: 300 to $2\times10^6$) connected in series in a high-performance liquid chromatography apparatus (High-Performance GPC apparatus "HLC-8220GPC", manufactured by TOSOH Corporation).

The multifunctional urethane (meth)acrylate oligomer (a1) preferably may have a radical polymerizable functional group equivalent of 400 g/eq or more. In this embodiment, the radical polymerizable functional group equivalent is a value showing the molecular weight per radical polymerizable functional group. When the radical polymerizable functional group equivalent is less than 400 g/eq, the impact resistance tends to decrease as the crosslink density increases.

Multifunctional Radical Polymerizable Compound Other than Multifunctional Urethane (Meth)Acrylate Oligomer (a1)

The curable resin composition of the present disclosure may contain one or more multifunctional radical polymerizable compounds other than the multifunctional urethane (meth)acrylate oligomer (a1) as the multifunctional radical polymerizable compound (A).

Examples of the multifunctional radical polymerizable compound other than the (a1) included in the curable resin composition include a multifunctional (meth)acrylate compound, a vinyl ether group-containing (meth)acrylate compound, a multifunctional (meth)acryloyl group-containing isocyanurate compound, a multifunctional (meth)acrylamide compound, a multifunctional maleimide compound, a multifunctional vinyl ether compound, and a multifunctional aromatic vinyl compound. In particular, from the viewpoint of improving the heat resistance while keeping the impact resistance high, the multifunctional (meth)acryloyl group-containing isocyanurate compound may be used.

Examples of the multifunctional (meth)acrylate compound include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butanediol di(meth)acrylate, 1,4-butanediol di(meth)acrylate, 1,5-pentanediol di(meth)acrylate, dimethylol tricyclodecane di(meth)acrylate, trimethylolpropane tri(meth)acrylate, neopentyl glycol di(meth)acrylate, 1,6-hexanediol di(meth)acrylate, hydroxypivalate neopentyl glycol di(meth)acrylate, pentaerythritol tri(meth)acrylate, pentaerythritol tetra(meth)acrylate, ditrimethylolpropane tetraacrylate, dipentaerythritol tetra(meth)acrylate, dipentaerythritol penta(meth)acrylate, dipentaerythritol hexa(meth)acrylate, 2-hydroxy-3-methacrylpropyl acrylate, di(meth)acrylate of an &-caprolactone adduct of neopentyl glycol hydroxypivalate (for example, KAYARAD series HX-220 and HX-620, manufactured by Nippon Kayaku Co., Ltd.), di(meth)acrylate of an EO adduct of bisphenol A, fluorine atom-containing multifunctional (meth)acrylate, multifunctional (meth)acrylate having a siloxane structure, polycarbonate diol di(meth)acrylate, polyester di(meth)acrylate, polyethylene glycol di(meth)acrylate, polyether-based multifunctional urethane (meth)acrylate, polyolefin-based multifunctional urethane (meth)acrylate, and (meth)acrylic-based multifunctional urethane (meth)acrylate.

Examples of the vinyl ether group-containing (meth) acrylate compound include 2-vinyloxyethyl (meth)acrylate, 4-vinyloxybutyl (meth)acrylate, 4-vinyloxycyclohexyl (meth)acrylate, 2-(vinyloxyethoxy)ethyl (meth)acrylate, and 2-[2-(2-vinyloxyethoxy)ethoxy]ethyl (meth)acrylate.

Examples of the multifunctional (meth)acryloyl group-containing isocyanurate compound include tri (acryloyloxyethyl) isocyanurate, tri(methacryloyloxyethyl) isocyanurate, and ¿-caprolactone-modified tris-(2-acryloxyethyl) isocyanurate.

Examples of the multifunctional (meth)acrylamide compound include N,N'-methylenebisacrylamide, N,N'-ethylenebisacrylamide, N,N'-(1,2-dihydroxyethylene)bisacrylamide, N,N'-methylenebismethacrylamide, and N,N',N"-triacryloyldiethylenetriamine.

Examples of the multifunctional maleimide compound include 4,4'-diphenylmethane bismaleimide, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, and 1,6-bismaleimide-(2,2,4-trimethyl) hexane.

Examples of the multifunctional vinyl ether compound include ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, bisphenol F alkylene oxide divinyl ether, trimethylolpropane trivinyl ether, ditrimethylolpropane tetravinyl ether, glycerin trivinyl ether, pentaerythritol tetravinyl ether, dipentaerythritol pentavinyl ether, and dipentaerythritol hexavinyl ether.

Examples of the multifunctional aromatic vinyl compound include divinylbenzene.

When the curable resin composition contains a multifunctional radical polymerizable compound with a radical polymerizable functional group equivalent of less than 300 g/eq other than the compound (a1), the content thereof is preferably 30 parts by mass or less based on 100 parts by mass of the total amount of the compound (A) and the compound (B) and is more preferably 25 parts by mass or less, further preferably 20 parts by mass or less, and most preferably less than 20 parts by mass. When the content of the multifunctional radical polymerizable compound with a radical polymerizable functional group equivalent of less than 300 g/eq other than the compound (a1) is higher than 30 parts by mass, the crosslink density of a cured product is increased, and at the same time, the crosslink density tends to be non-uniform. Accordingly, a portion where stress is concentrated when an impact is applied from the outside is generated, an effect of improving the impact resistance that is expected by addition of a rubber particle is not obtained, and Charpy impact strength may be comparable to that of existing technology.

When a multifunctional radical polymerizable compound with a radical polymerizable functional group equivalent of 300 g/eq or more other than the compound (a1) is contained, the content thereof is preferably 40 parts by mass or less based on 100 parts by mass of the total amount of the compound (A) and the compound (B) and is more preferably 35 parts by mass or less. When the content of the multifunctional radical polymerizable compound with a radical polymerizable functional group equivalent of 300 g/eq or more other than the compound (a1) is higher than 40 parts by mass, the heat resistance decreases, and at the same time, the elasticity module of the obtained cured product tends to decrease.

Monofunctional Radical Polymerizable Compound (B)

The monofunctional radical polymerizable compound (B) in the curable resin composition of the present disclosure can be also a compound having only one radical polymerizable functional group in its molecule.

Examples of the radical polymerizable functional group include an ethylenically unsaturated group. Concrete examples of the ethylenically unsaturated group include a (meth)acryloyl group and a vinyl group. As described above, in a compound in which two ethylenically unsaturated groups in a molecule are cyclopolymerized, the two ethylenically unsaturated groups in a molecule to be cyclopolymerized are defined as one radical polymerizable functional group.

Examples of the monofunctional radical polymerizable compound (B) having a (meth)acryloyl group include a monofunctional (meth)acrylamide compound and a monofunctional (meth)acrylate compound.

Examples of the monofunctional (meth)acrylamide compound include (meth)acrylamide, N-methyl (meth)acrylamide, N-isopropyl (meth)acrylamide, N-tert-butyl (meth)acrylamide, N-phenyl (meth)acrylamide, N-methylol (meth) acrylamide, N,N-diacetone (meth)acrylamide, N,N-dimethyl (meth)acrylamide, N,N-diethyl (meth)acrylamide, N,N-dipropyl (meth)acrylamide, N,N-dibutyl (meth)acrylamide, N-(meth)acryloyl morpholine, N-(meth)acryloylpiperidine, and N-[3-(dimethylamino)propyl]acrylamide.

Examples of the monofunctional (meth)acrylate compound include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth) acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, 3-methyl-3-oxetanyl-methyl (meth) acrylate, tetrahydrofurfuryl (meth)acrylate, phenylglycidyl (meth)acrylate, dimethylaminomethyl (meth)acrylate, phenyl cellosolve (meth)acrylate, dicyclopentenyl (meth)acrylate, dicyclopentenyloxyethyl (meth)acrylate, biphenyl (meth)acrylate, 2-hydroxyethyl (meth)acryloyl phosphate, phenyl (meth)acrylate, phenoxyethyl (meth)acrylate, phenoxypropyl (meth)acrylate, benzyl (meth)acrylate, butoxy triethylene glycol (meth)acrylate, 2-ethylhexyl polyethylene glycol (meth)acrylate, nonylphenyl polypropylene glycol (meth)acrylate, methoxydipropylene glycol (meth)acrylate, glycidyl (meth)acrylate, glycerol (meth)acrylate, trifluoromethyl (meth)acrylate, trifluoroethyl (meth)acrylate, tetrafluoropropyl (meth)acrylate, octafluoropentyl acrylate, polyethylene glycol (meth)acrylate, polypropylene glycol (meth) acrylate, allyl (meth)acrylate, epichlorohydrin-modified butyl (meth)acrylate, epichlorohydrin-modified phenoxy (meth)acrylate, ethylene oxide (EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth)acrylate, EO-modified phosphoric acid (meth)acrylate, methyl 2-(allyloxymethyl) acrylate (product name: AO-MA, manufactured by Nippon Shokubai Co., Ltd.), monofunctional (meth)acrylates having an imide group (product name: M-140, manufactured by TOAGOSEI Co., Ltd.), and monofunctional (meth)acrylates having a siloxane structure.

Examples of the monofunctional radical polymerizable compound having an ethylenically unsaturated group other than a (meth)acryloyl group include styrene and styrene derivatives such ash vinyl toluene, α-methylstyrene, chlorostyrene, styrenesulfonic acid and salts thereof; maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl esters such as vinyl acetate, vinyl propionate, vinyl pivalate, vinyl benzoate, and vinyl cinnamate; vinyl cyanide compounds such as (meth) acrylonitrile; and N-vinyl compounds such as N-vinylpyrrolidone, N-vinyl-8-caprolactam, N-vinylimidazole, N-vinylmorpholine, N-vinylacetamide, and vinyl methyl oxazolidinone.

These monofunctional radical polymerizable compounds may be used alone or in combination of two or more thereof.

The monofunctional radical polymerizable compound (B) may contain a monofunctional radical polymerizable compound (b2) satisfying the expression (4) below. The log(S) will be described later.

$$\log(S)>0.4 \quad (4)$$

log(S): common logarithm of solubility in water at 25° C.

The content of the monofunctional radical polymerizable compound (b2) in the curable resin composition is preferably 8 parts by mass or more and 55 parts by mass or less based on 100 parts by mass of the total amount of the compound (A) and the compound (B) and is more preferably 10 parts by mass or more and 50 parts by mass or less. When the content of the monofunctional radical polymerizable compound (b2) is 8 parts by mass or more and 55 parts by mass or less, the viscosity of the resin composition tends to be low, and the water absorbency of the cured product tends to be low, and it tends to exhibit high dimensional stability even in a high humidity environment.

From the viewpoint of increasing the curing rate, as the monofunctional radical polymerizable compound (b2), at least one compound selected from the group consisting of a monofunctional acrylamide compound, a monofunctional acrylate compound, and an N-vinyl compound may be contained. In particular, a monofunctional acrylamide compound or an N-vinyl compound may be contained. Furthermore, a monofunctional acrylamide compound or N-vinyl compound having a cyclic structure may be contained. Specifically, since both high heat resistance and high impact resistance tend to be easily achieved, the monofunctional acrylamide compound may be a compound having a cyclic structure, such as acryloylmorpholine and phenylacrylamide. The N-vinyl compound may be a compound having a cyclic structure, such as N-vinylpyrrolidone, N-vinyl-ε-caprolactam, N-vinylimidazole, N-vinylmorpholine, and vinylmethyloxazolidinone.

When an N-vinyl compound is used as the monofunctional radical polymerizable compound (B), the content of the N-vinyl group is preferably 80 mol % or less based on the total amount of the radical polymerizable functional groups in the curable resin composition, and is more preferably 75 mol % or less. Homopolymerization of the N-vinyl compound is difficult, but the curing is significantly accelerated by adjusting the content of the N-vinyl group based on the total amount of the radical polymerizable functional groups to 80 mol % or less, and the N-vinyl compound can be suitably used as a shaping material to be used in stereolithography.

When a monofunctional methacrylate compound is used as the monofunctional radical polymerizable compound (B), the curing rate tends to be high by controlling the content of the methacrylate group to 60 mol % or less based on the total amount of the radical polymerizable functional groups in the curable resin composition. The content of the methacrylate group is more preferably 40 mol % or less, further preferably 20 mol % or less, or 0 mol %. Here, as the monofunctional methacrylate compound, a compound having a substituted methacrylate group, such as methyl 2-(allyloxymethyl) acrylate (product name: AO-MA, manufactured by Nippon Shokubai Co., Ltd.), is included, and as the methacrylate group, a substituted methacrylate group is included. When the content of the methacrylate group is higher than 60 mol %, the curing rate tends to decrease, and such a compound tends not to be suitable as a shaping material to be used in stereolithography.

The content of the monofunctional radical polymerizable compound having an alicyclic hydrocarbon group is preferably 50 parts by mass or less based on 100 parts by mass of the total amount of the compound (A) and the compound (B) and is more preferably 40 parts by mass or less and further preferably 30 parts by mass or less. If the content of the monofunctional radical polymerizable compound having an alicyclic hydrocarbon group is higher than 50 parts by mass, the impact resistance tends to decrease. In addition, the viscosity of the curable resin composition increases when the rubber particle (C) is added, and the workability during the production of a cured product tends to decrease. For example, when the curable resin composition is used as a shaping material of stereolithography, since the viscosity is high, the shaping time is elongated, mixing of bubbles into the shaped object is caused, and shaping itself may become difficult.

Examples of the monofunctional radical polymerizable compound having an alicyclic hydrocarbon group include isobornyl (meth)acrylate, dicyclopentanyl (meth)acrylate, dicyclopentenyl (meth)acrylate, cyclohexyl (meth)acrylate, 4-t-butylcyclohexyl acrylate, 3,3,5-trimethylcyclohexyl acrylate, 2-methyl-2-adamantyl (meth)acrylate, and 2-ethyl-2-adamantyl (meth)acrylate.

The glass transition temperature (Tg) of the homopolymer or copolymer of the monofunctional radical polymerizable compound (B) is preferably 50° C. or more and more preferably 60° C. or more. The Tg of a copolymer can be determined by the FOX expression (the following expression (I)). The unit of Tg is the absolute temperature.

$$1/Tg = \sum (W_i/Tg_i). \quad \text{expression (I)}$$

In the expression (I), $W_i$ represents the mass ratio of each monofunctional radical polymerizable compound in the copolymer. $Tg_i$ represents the glass transition temperature (unit: absolute temperature) of the homopolymer of each monofunctional radical polymerizable compound. As the glass transition temperature ($Tg_i$) of the homopolymer of each radical polymerizable component used in the FOX expression, the value that is generally known for each polymer can be adopted. Alternatively, a polymer is actually produced, and a measured value obtained by differential scanning calorimetry (DSC) or dynamic mechanical analysis (DMA) may be used.

The content of the monofunctional radical polymerizable compound (B) in the curable resin composition is preferably 30 parts by mass or more and 75 parts by mass or less based on 100 parts by mass of the total amount of the compound (A) and the compound (B) and is more preferably 35 parts by mass or more and 70 parts by mass or less. When the content of the monofunctional radical polymerizable compound (B) is 30 parts by mass or more and 75 parts by mass or less, the impact resistance tends to increase.

Radical Polymerizable Compound Satisfying Expressions (1) to (3) (Multifunctional Radical Polymerizable Compound (a2) and Monofunctional Radical Polymerizable Compound (b1))

In the curable resin composition of the present disclosure, at least one of the multifunctional radical polymerizable compound (A) or the monofunctional radical polymerizable compound (B) contains at least one radical polymerizable compound satisfying the expressions (1) to (3) below:

$$\log(S) \leq 0.4 \quad (1)$$

$$3.0 \leq \delta P \text{ value} \leq 6.0 \quad (2)$$

$$\text{Molecular weight} \leq 500 \quad (3)$$

log(S): common logarithm of solubility in water at 25° C., and

δP value: value of dipole interaction energy in Hansen solubility parameter.

The radical polymerizable compound satisfying the expressions (1) to (3) is a radical polymerizable compound other than the multifunctional urethane (meth)acrylate oligomer (a1). The radical polymerizable compound satisfying the expressions (1) to (3) may be a multifunctional radical polymerizable compound (a2) or a monofunctional radical polymerizable compound (b1). Hereinafter, the multifunctional radical polymerizable compound (a2) and the monofunctional radical polymerizable compound (b1) may be simply referred to as "compound (a2)" and "compound (b1)", respectively.

The log(S) of each of the compound (a2) and compound (b1) satisfies the expression (1) below and may satisfy the expression (1a) below or the expression (1b) below. By satisfying the expression (1), the cured product has reduced water absorbency and tends to exhibit high dimensional stability even in a high humidity environment. The log(S) is the common logarithm of the amount (solubility), S (g/100 g), of a compound dissolved in 100 g of water with a temperature of 25° C., and the smaller the value of log(S), the less soluble it is in water.

$$\log(S) \leq 0.4 \quad (1)$$

$$\log(S) \leq 0.3 \quad (1a)$$

$$\log(S) \leq 0.2 \quad (1b)$$

The δP values of the compound (a2) and the compound (b1) satisfy the expression (2) below and may satisfy the expression (2a) or the expression (2b) below. By satisfying the expression (2), the viscosity of the resin composition can be significantly decreased. The δP value by the Hansen solubility parameter is a value showing the dipole moment, i.e., polarity magnitude, and the larger the δP value, the greater the polarity.

$$3.0 \leq \delta P \text{ value} \leq 6.0 \quad (2)$$

$$3.5 \leq \delta P \text{ value} \leq 5.8 \quad (2a)$$

$$4.0 \leq \delta P \text{ value} \leq 5.6 \quad (2b)$$

The effect of decreasing the viscosity of a resin composition is the highest when the δP value of the compound (a2) or the compound (b1) is near 5.0, and tends to gradually decrease as the δP value departs therefrom. When the δP value is less than 3.0, the polarity is low to work for accelerating hydrogen bond formation between the multifunctional urethane (meth)acrylate oligomer (a1) molecules. Accordingly, the viscosity significantly increases. When the δP value is higher than 6.0, the polarity is high to work for accelerating hydrophobic interaction between the multifunctional urethane (meth)acrylate oligomer (a1) molecules. Accordingly, the viscosity significantly increases.

The δD values of the compound (a2) and the compound (b1) may satisfy the expression (2c) below or may further satisfy the expression (2d) below. The δH value of the compound (b1) may satisfy the expression (2e) or may further satisfy the expression (2f) below.

$$15.0 \leq \delta D \text{ value} \leq 18.5 \quad (2c)$$

$$15.5 \leq \delta D \text{ value} \leq 18.0 \quad (2d)$$

$$4.0 \leq \delta H \text{ value} \leq 7.5 \quad (2e)$$

$$4.5 \leq \delta H \text{ value} \leq 7.0 \quad (2f)$$

δD value: the value of dispersion energy in Hansen solubility parameter

δH value: the value of hydrogen bond energy in Hansen solubility parameter

The log(S), the δP value, the δD value, and the δH value can be easily predicted from the chemical structure by using computer software Hansen Solubility Parameter in Practice (HSPiP), 5th Edition, 5.3.05.

Furthermore, the molecular weights of the compound (a2) and the compound (b1) satisfy the expression (3) below and may satisfy the expression (3a) below or the expression (3b) below. By satisfying the expression (3), the viscosity of the resin composition can be significantly decreased.

$$\text{Molecular weight} \leq 500 \quad (3)$$

$$\text{Molecular weight} \leq 400 \quad (3a)$$

$$\text{Molecular weight} \leq 300 \quad (3b)$$

Examples of the multifunctional radical polymerizable compound (a2) include radical polymerizable compounds satisfying the expressions (1) to (3) among the multifunctional radical polymerizable compounds other than the above-mentioned compound (a1). In particular, from the viewpoint of a high effect of decreasing viscosity, the multifunctional radical polymerizable compound (a2) may be a multifunctional (meth)acrylate compound satisfying the expressions (1) to (3). Examples of the multifunctional (meth)acrylate compound corresponding to the compound (a2) include compounds shown in Table 1.

The compounds shown in Table 1 each have a molecular weight of 500 or less.

TABLE 1

| Compound | log (S) | δP value |
|---|---|---|
| 2-Hydroxy-3-methacrylpropyl acrylate | 0.11 | 5.6 |
| 1,3-Propandiol diacrylate | −0.08 | 4.9 |
| 1,4-Butanediol diacrylate | −0.55 | 4.3 |
| 1,5-Pentanediol diacrylate | −1.37 | 4.1 |
| Pentaerythritol triacrylate | −0.22 | 4.1 |
| 1,6-Hexanediol diacrylate | −2.01 | 3.9 |
| Dipropylene glycol diacrylate | −1.28 | 3.9 |
| 3-Methyl-1,5-pentanediol diacrylate | −1.93 | 3.7 |
| Tripropylene glycol diacrylate | −1.66 | 3.6 |
| Neopentyl glycol diacrylate | −0.59 | 3.5 |
| 1,9-Nonanediol diacrylate | −3.01 | 3.3 |
| 1,6-Hexanediol dimethacrylate | −2.51 | 3.2 |

TABLE 1-continued

| Compound | log (S) | δP value |
|---|---|---|
| 3-Methyl-1,5-pentanediol dimethacrylate | −2.43 | 3.1 |
| Pentaerythritol triacrylate | −0.22 | 4.1 |
| Pentaerythritol trimethacrylate | −0.92 | 3.0 |

Examples of the monofunctional radical polymerizable compound (b1) include radical polymerizable compounds satisfying the expressions (1) to (3) among the above-mentioned monofunctional radical polymerizable compound (B). In particular, from the viewpoint of a high effect of decreasing viscosity, the monofunctional radical polymerizable compound (b1) may be a monofunctional (meth) acrylate compound satisfying the expressions (1) to (3). Examples of the monofunctional (meth)acrylate compound corresponding to the compound (b1) include compounds shown in Table 2. The compounds shown in Table 2 each have a molecular weight of 500 or less.

TABLE 2

| Compound | log (S) | δP value |
|---|---|---|
| Tetrahydrofurfuryl acrylate | 0.28 | 5.6 |
| Methyl methacrylate | 0.26 | 5.3 |
| 2-Hydroxybutyl methacrylate | 0.32 | 5.1 |
| Methyl 2-(allyloxymethyl)acrylate "AO-MA" (manufactured by Nippon Shokubai Co., Ltd.) | −0.11 | 4.7 |
| Ethyl methacrylate | −0.19 | 4.7 |
| n-Butyl acrylate | −0.54 | 4.2 |
| Isobutyl acrylate | −0.36 | 4.0 |
| Benzyl acrylate | −1.08 | 3.9 |
| n-Butyl methacrylate | −1.24 | 3.7 |
| Isobutyl methacrylate | −1.06 | 3.5 |
| t-Butyl methacrylate | −0.18 | 3.5 |
| Ethylhexyl acrylate | −1.15 | 3.5 |
| Cyclohexyl acrylate | −0.53 | 3.5 |
| Cyclohexyl methacrylate | −0.91 | 3.2 |
| t-Butyl methacrylate | −0.86 | 3.1 |
| Ethylhexyl methacrylate | −1.55 | 3.1 |
| n-Octyl acrylate | −2.60 | 3.1 |
| t-Butyl methacrylate | −1.55 | 3.1 |

As the radical polymerizable compound satisfying the expressions (1) to (3), the monofunctional radical polymerizable compound (b1) may be contained, and from the viewpoint of being capable of achieving a high effect of decreasing viscosity and a high impact resistance, methyl 2-(allyloxymethyl) acrylate (product name: AO-MA, manufactured by Nippon Shokubai Co., Ltd.) may be contained.

The content of the radical polymerizable compound satisfying the expressions (1) to (3) is 2 parts by mass or more and 75 parts by mass or less based on 100 parts by mass of the total amount of the compound (A) and the compound (B) and is preferably 3 parts by mass or more and 50 parts by mass or less and more preferably 4 parts by mass or more and 40 parts by mass or less. When the content of the radical polymerizable compound satisfying the expressions (1) to (3) is 2 parts by mass or more and 75 parts by mass or less, the effect of decreasing the viscosity of the resin composition tends to be significantly developed.

Rubber Particle (C)

The impact resistance of a cured product can be improved by adding a rubber particle (C) to the curable resin composition.

The type of the rubber particle is not particularly limited. Examples of a composition constituting the rubber particle include a butadiene rubber, a styrene/butadiene copolymer rubber, an acrylonitrile/butadiene copolymer rubber, saturated rubbers obtained by hydrogenating or partially hydrogenating these diene rubbers, a cross-linked butadiene rubber, an isoprene rubber, a chloroprene rubber, a natural rubber, a silicon rubber, an ethylene/propylene/diene monomer three-dimensional copolymer rubber, an acrylic rubber, and an acrylic/silicone composite rubber. The rubber particle may be constituted of a single of these compositions or a combination of two or more of these composition. In particular, from the viewpoint of improving impact resistance and suppressing an increase in the viscosity of the curable resin composition, any of a butadiene rubber, a cross-linked butadiene rubber, a styrene/butadiene copolymer rubber, an acrylic rubber, or a silicone/acrylic composite rubber may be used, and any of a butadiene rubber or a cross-linked butadiene rubber may be used.

The glass transition temperature of the composition of the rubber particle is preferably 0° C. or less and more preferably −20° C. or less. When the glass transition temperature is higher than 0° C., it tends to become difficult to obtain the effect of improving impact resistance. The glass transition temperature of the composition of the rubber particle can be determined by, for example, differential scanning calorimetry (DSC) or dynamic mechanical analysis (DMA).

The rubber particle may be a rubber particle having a core-shell structure. Specifically, the rubber particle may be a rubber particle having a core composed of a composition of the above-described rubber particle and further having a shell composed of a polymer of a radical polymerizable compound covering the outer surface of the core. The dispersibility of the rubber particle in the resin composition of the present disclosure can be improved by using a rubber particle having a core-shell structure. As a result, a cured product in which a rubber particle has been well dispersed is obtained, and impact resistance can be more improved by that the rubber particle effectively functions in the cured product.

The polymer of a radical polymerizable compound forming a shell may have a form covering a part or the whole of the core by graft polymerization to the core surface via a chemical bond. The rubber particle having a core-shell structure made by graft polymerization of a shell to a core can be formed through graft polymerization of a radical polymerizable compound by a known method in the presence a particle that will become a core. For example, the rubber particle can be manufactured by adding and polymerizing a radical polymerizable compound being a component of the shell to a latex particle dispersed in water, which can be prepared by emulsion polymerization, miniemulsion polymerization, suspension polymerization, seed polymerization, or the like.

When the surface of the core has no or very few reactive sites, such as an ethylenically unsaturated group, to which the shell can be graft-polymerized, an intermediate layer containing a reactive site may be provided on the surface of the particle becoming a core, and a shell may be then graft-polymerized. That is, as the form of the rubber particle having a core-shell structure, a form in which a shell is provided to a core via an intermediate layer is also included.

The monofunctional radical polymerizable compound that is used for forming the shell can be appropriately selected considering the affinity with the composition constituting the core and the dispersibility in the resin composition. For example, one or a combination of two or more from the materials exemplified as the monofunctional radical polymerizable compound (B) may be used. When the shell includes a polymer of a monofunctional radical polymerizable compound having a (meth)acryloyl group, the rubber particle tends to be well dispersed in the curable resin composition. In addition, from the viewpoint of a high effect of decreasing the viscosity of a resin composition by containing a radical polymerizable compound satisfying the expressions (1) to (3), the rubber particle may have a shell including a polymer of a monofunctional radical polymerizable compound (b1).

As the radical polymerizable compound for forming the shell, a monofunctional radical polymerizable compound and a multifunctional radical polymerizable compound may be used in combination. When the shell is formed using a multifunctional radical polymerizable compound, the viscosity of the curable resin composition decreases, and it tends to be easier to handle. However, when the content of the multifunctional radical polymerizable compound is excessively high, it tends to become difficult to obtain the effect of improving impact resistance by addition of a rubber particle having a core-shell structure. Accordingly, the amount of the multifunctional radical polymerizable compound to be used for forming the shell is preferably 0 parts by mass or more and 40 parts by mass or less based on 100 parts by mass of the radical polymerizable compound to be used for forming the shell and is more preferably 0 parts by mass or more and 30 parts by mass or less and particularly preferably 0 parts by mass or more and 25 parts by mass or less. The multifunctional radical polymerizable compound to be used for forming the shell can be appropriately selected considering the affinity with the composition constituting the core and the dispersibility in the resin composition. One or a combination of two or more from the materials exemplified as the multifunctional radical polymerizable compound (A) may be used.

As the mass ratio of the core and the shell in the rubber particle having a core-shell structure, the amount of the shell is preferably 1 part by mass or more and 200 parts by mass or less based on 100 parts by mass of the core and is more preferably 2 parts by mass or more and 180 parts by mass or less. When the mass ratio of the core and the shell is within the above range, the impact resistance can be more effectively improved by containing the rubber particle. When the amount of the shell is less than 1 part by mass, since the dispersibility of the rubber particle in the curable resin composition is insufficient, it tends to be difficult to obtain the effect of improving impact resistance. When the amount of the shell is higher than 200 parts by mass, although the dispersibility in the curable resin composition is excellent, since the rubber particle is thickly covered with the shell, the effect of improving impact resistance by the rubber component tends to be decreased. Accordingly, addition of a large amount of the rubber particle is necessary for obtaining sufficient impact resistance, and the viscosity of the curable resin composition tends to be increased, resulting in difficulty in handling.

The rubber particle preferably has an average particle size of 20 nm or more and 10 μm or less and more preferably 50 nm or more and 5 μm or less. When the average particle size is less than 20 nm, a decrease in the heat resistance or impact resistance of the cured product tends to be caused by an increase in the viscosity of the curable resin composition due to addition of the rubber particle or by the interaction between individual rubber particles occurring due to an increase in the specific surface area of the rubber particle.

When the average particle size is higher than 10 μm, the rubber particle (rubber component) becomes difficult to disperse in the curable resin composition, and the effect of improving impact resistance by addition of the rubber particle tends to decrease.

The average particle size of the rubber particle in this embodiment is an arithmetic (number) average particle size and can be measured using dynamic light scattering. For example, a rubber particle is dispersed in an appropriate organic solvent, and the average particle size can be measured using a particle size analyzer.

The gel fraction of the rubber particle is preferably 5% or more. When the gel fraction is less than 5%, both the impact resistance and the heat resistance tend to decrease. The gel fraction can be determined by the following procedure. W1 (g) of a dry rubber particle is immersed in a sufficient amount of toluene and is left at room temperature for 7 days. Subsequently, the solid content is collected by centrifugation or the like and is dried at 100° C. for 2 hours, and the amount of the dried solid content is measured. The gel fraction can be determined using the mass (W2 (g)) of the solid content obtained after drying by the following expression:

$$\text{Gel fraction (\%)} = W2/W1 \times 100.$$

The content of the rubber particle in the curable resin composition is preferably 2 parts by mass or more and 25 parts by mass or less based on 100 parts by mass of the total amount of the multifunctional radical polymerizable compound (A) and the monofunctional radical polymerizable compound (B) and is more preferably 3 parts by mass or more and 20 parts by mass or less. When the content of the rubber particle is less than 2 parts by mass, it tends to become difficult to obtain the effect of improving impact resistance by addition of a rubber particle. When the content of the rubber particle is higher than 25 parts by mass, the viscosity of the obtained cured product tends to increase, and the workability during the production of a cured product tends to decrease.

Radical Polymerization Initiator (D)

As the radical polymerization initiator (D), a photo radical polymerization initiator or a thermal radical polymerization initiator can be used.

Photo Radical Polymerization Initiator

Photo radical polymerization initiators are mainly classified into an intramolecular cleavage type and a hydrogen abstraction type. In intramolecular cleavage photo radical polymerization initiators, a bond at a specific site is cleaved by absorbing light with a specific wavelength. A radical is generated at the cleaved site and functions as a polymerization initiator to start polymerization of a radical polymerizable compound, such as an ethylenically unsaturated compound containing a (meth)acryloyl group. In the hydrogen abstraction type, the initiator absorbs light with a specific wavelength and becomes an excited state, and the excited species causes a reaction of abstracting hydrogen from a hydrogen donor surrounding it to generate a radical, which functions as a polymerization initiator to cause polymerization of a radical polymerizable compound.

As the intramolecular cleavage type photo radical polymerization initiator, for example, an alkylphenone photo radical polymerization initiator, an acylphosphine oxide photo radical polymerization initiator, and an oxime ester photo radical polymerization initiator are known. These initiators generate radical species by α-cleavage of the bond adjacent to a carbonyl group.

Examples of the alkylphenone photo radical polymerization initiator include a benzyl methyl ketal photo radical polymerization initiator, an α-hydroxyalkylphenone photo radical polymerization initiator, and an aminoalkylphenone photo radical polymerization initiator. Concrete examples of the compound include the following compounds. An example of the product name is also listed in parentheses. Examples of the benzyl methyl ketal photo radical polymerization initiator include 2,2'-dimethoxy-1,2-diphenylethan-1-on (Irgacure (registered trademark) 651, manufactured by BASF SE); examples of the α-hydroxyalkylphenone photo radical polymerization initiator include 2-hydroxy-2-methyl-1-phenylpropan-1-on (Darocur 1173, manufactured by BASF SE), 1-hydroxycyclohexylphenyl ketone (Irgacure 184, manufactured by BASF SE), 1-[4-(2-hydroxyethoxy)phenyl]-2-hydroxy-2-methyl-1-propan-1-on (Irgacure 2959, manufactured by BASF SE), and 2-hydroxy-1-{4-[4-(2-hydroxy-2-methylpropionyl)benzyl]phenyl}-2-methylpropan-1-on (Irgacure 127, manufactured by BASF SE); and examples of the aminoalkylphenone photo radical polymerization initiator include 2-methyl-1-(4-methylthiophenyl)-2-morpholinopropan-1-on (Irgacure 907, manufactured by BASF SE) and 2-benzylmethyl-2-dimethylamino-1-(4-morpholinophenyl)-1-butanone (Irgacure 369, manufactured by BASF SE), but they are not limited thereto.

Examples of the acylphosphine oxide photo radical polymerization initiator include, but not limited to, 2,4,6-trimethylbenzoyl diphenylphosphine oxide (Lucirin TPO, manufactured by BASF SE) and bis(2,4,6-trimethylbebenzoyl)-phenylphosphine oxide (Irgacure 819, manufactured by BASF SE).

Examples of the oxime ester photo radical polymerization initiator include, but not limited to, (2E)-2-(benzoyloxyimino)-1-[4-(phenylthio)phenyl]octan-1-one (Irgacure OXE-01, manufactured by BASF SE).

Examples of the hydrogen abstraction type radical polymerization initiator include, but not limited to, anthraquinone derivatives such as 2-ethyl-9,10-anthraquinone and 2-t-butyl-9,10-anthraquinone and thioxanthone derivatives such as isopropylthioxanthone and 2,4-diethylthioxanthone.

These photo radical polymerization initiators may be used alone or in combination of two or more thereof. Alternatively, they may be used in combination with thermal radical polymerization initiators described later.

The amount of the photo radical polymerization initiator is preferably 0.1 part by mass or more and 15 parts by mass or less based on 100 parts by mass of the radical polymerizable compound in the curable resin composition and is more preferably 0.1 part by mass or more and 10 parts by mass or less. When the amount of the photo radical polymerization initiator is low, polymerization tends to become insufficient. When the amount of the polymerization initiator added is excessive, the molecular weight does not increase, and there is a risk that the heat resistance or the impact resistance decreases. Here, the radical polymerizable compound is a combination of the multifunctional radical polymerizable compound (A) and the monofunctional radical polymerizable compound (B).

Thermal Radical Polymerization Initiator

The thermal radical polymerization initiator is not particularly limited as long as it generates a radical by heating, and a known compound can be used. For example, an azo compound, a peroxide, or a persulfate can be used.

Examples of the azo compound include 2,2'-azobisisobutyronitrile, 2,2'-azobis(methylisobutyrate), 2,2'-azobis-2,4-dimethylvaleronitrile, and 1,1'-azobis(1-acetoxy-1-phenylethane). Examples of the peroxide include benzoyl peroxide, di-t-butylbenzoyl peroxide, t-butylperoxy pivalate, and di(4-t-butylcyclohexyl) peroxydicarbonate. Examples of the persulfate include ammonium persulfate, sodium persulfate, and potassium persulfate.

The amount of the thermal radical polymerization initiator is preferably 0.1 part by mass or more and 15 parts by mass or less based on 100 parts by mass of the radical polymerizable compound in the curable resin composition and is more preferably 0.1 part by mass or more and 10 parts by mass or less. When the amount of the polymerization initiator added is excessive, the molecular weight does not increase, and the heat resistance or the impact resistance may be decreased.

Other Component (E)

The curable resin composition may contain another component in a range that does not deteriorate the purpose and effect of the present disclosure.

Examples of such another component include physical property modifier for imparting a desired physical property to a cured product, a photosensitizer, a polymerization initiation aid, a polymerization inhibitor, a leveling agent, a wettability improver, a surfactant, a plasticizer, an ultraviolet absorber, a silane coupling agent, an inorganic filler, a pigment, a dye, an antioxidant, a flame retardant, a thickener, and an antifoaming agent.

The amount of such another component is preferably 0.01 part by mass or more and 25 parts by mass or less based on 100 parts by mass of the total amount of the multifunctional radical polymerizable compound (A) and the monofunctional radical polymerizable compound (B) and is more preferably 0.05 parts by mass or more and 20 parts by mass or less. In this range, desired physical properties can be imparted to the cured product or the curable resin composition without causing a decrease in the impact resistance and an increase in the water absorption rate of the obtained cured product.

Examples of the physical property modifier for imparting a desired physical property to a cured product include resins such as an epoxy resin, polyurethane, polychloroprene, polyester, polysiloxane, a petroleum resin, a xylene resin, a ketone resin, and a cellulose resin; engineering plastics such as polycarbonate, modified polyphenylene ether, polyamide, polyacetal, polyethylene terephthalate, polybutylene terephthalate, a ultrahigh molecular weight polyethylene, polyphenylsulfone, polysulfone, polyacrylate, polyether imide, polyether ether ketone, polyphenylene sulfide, polyether sulfone, polyamideimide, a liquid crystal polymer, polytetrafluoroethylene, polychlorotrifluoroethylene, and polyvinylidene fluoride; a fluorine-based oligomer, a silicone oligomer, and a polysulfide oligomer; soft metals such as gold, silver, and lead; and lamellar crystal structures such as graphite, molybdenum disulfide, tungsten disulfide, boron nitride, graphite fluoride, calcium fluoride, barium fluoride, lithium fluoride, silicon nitride, and molybdenum selenide.

Examples of the photosensitizer include polymerization inhibitors such as phenothiazine and 2,6-di-t-butyl-4-methylphenol, a benzoyl compound, an acetophenone compound, an anthraquinone compound, a thioxanthone compound, a ketal compound, a benzophenone compound, a tertiary amine compound, and a xanthone compound.

Curable Resin Composition

In manufacturing the curable resin composition, a multifunctional radical polymerizable compound (A), a monofunctional radical polymerizable compound (B), a rubber particle (C), a radical polymerization initiator (D), and other components as needed are placed in a stirring container at appropriate amounts and are stirred. The stirring temperature is usually 20° C. or more and 120° C. or less and preferably 40° C. or more and 100° C. or less. A curable resin composition can be manufactured by removing volatile solvent and the like as needed.

The curable resin composition according to this embodiment can be suitably used as a shaping material that is used in stereolithography. That is, a shaped object with a desired shape can be manufactured by selectively irradiating the curable resin composition of this embodiment with an active energy ray to supply energy necessary for curing. When the curable resin composition of this embodiment is used as a shaping material of stereolithography, the viscosity at 25° C. under a constant shear velocity of 50 $s^{-1}$ is preferably 0.05 Pa·s or more and 2.2 Pa·s or less and more preferably 0.10 Pas or more and 2.0 Pa·s or less.

Method for Manufacturing Article

A cured product (shaped object or article) made by curing the curable resin composition according to this embodiment can be produced by using known stereolithography and apparatus. A typical stereolithography is a method including a step of repeating curing a curable resin composition at a predetermined thickness based on slice data generated from three-dimensional shape data of a manufacturing object (shaping model). The method is roughly classified into two methods: a free liquid surface method and a regulated liquid surface method.

Figure 2:
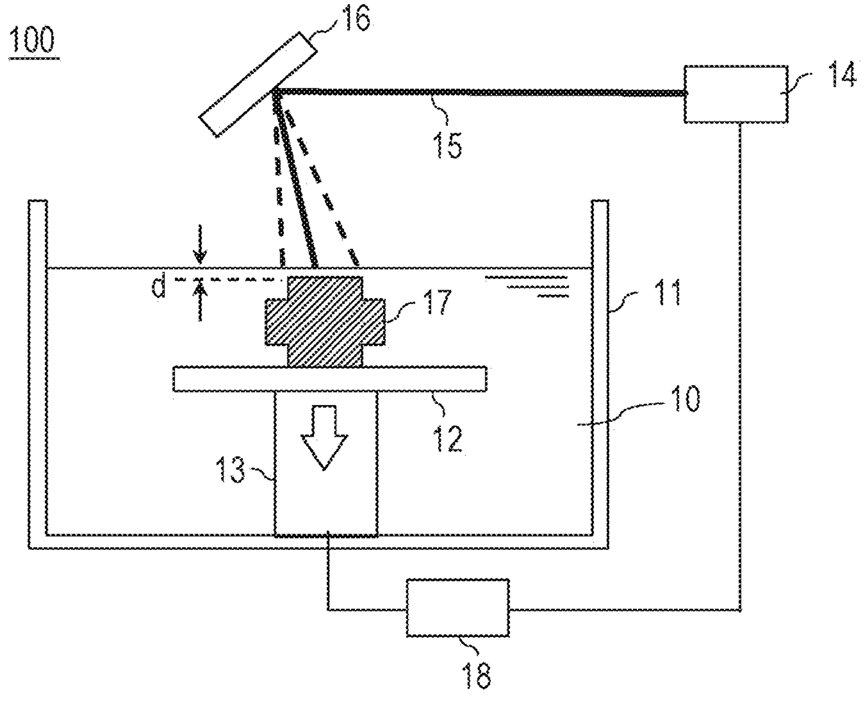
FIG. 2 is a schematic diagram illustrating a configuration example of a stereolithography apparatus.

FIG. 2 shows a configuration example of a stereolithography apparatus 100 using a free liquid surface method. The stereolithography apparatus 100 includes a tank 11 filled with a curable resin composition 10 in a liquid state. A shaping stage 12 is provided inside the tank 11 so as to be capable of being driven in the vertical direction by a driving shaft 13. The irradiation position with a light energy ray 15 for curing the curable resin composition 10 ejected from a light source 14 is changed with a galvanometer mirror 16 that is controlled by a controller 18 according to the slice data, and the surface of the tank 11 is scanned. In FIG. 2, the scanning range is indicated by bold dashed lines.

The thickness d of the curable resin composition 10 that is cured with the light energy ray 15 is a value that is determined based on the setting when slice data are generated and influences the precision of a shaped object to be obtained (reproducibility of three-dimensional shape data of an article to be shaped). The thickness d is achieved by controlling the drive amount of the driving shaft 13 by the controller 18.

First, the controller 18 controls the driving shaft 13 based on the setting to supply a curable resin composition on the stage 12 at a thickness d. The curable resin composition in a liquid state on the stage 12 is irradiated selectively with a light energy ray based on slice data so as to obtain a cured layer with a desired pattern to form a cured layer. Subsequently, the stage 12 is moved to the direction indicated by an outlined arrow, and an uncured curable resin composition is supplied with a thickness d on the surface of the cured layer and is irradiated with a light energy ray 15 based on slice data to form a cured product unified with the previously formed cured layer. By repeating this step of curing in a lamellar form, an aimed three-dimensional shaped object 17 can be obtained.

The thus-obtained three-dimensional shaped object is taken out from the tank 11, and unreacted curable resin composition remaining on the surface is removed, followed by washing as needed. As the detergent, alcohol-based organic solvents represented by alcohols such as isopropyl alcohol and ethyl alcohol can be used. In addition, ketone-based organic solvents represented by acetone, ethyl acetate, and methyl ethyl ketone or aliphatic organic solvents represented by terpenes may be used. After washing with a detergent, post cure by light irradiation or heat irradiation may be performed as needed. The post cure can cure the unreacted curable resin composition remaining on the surface and inside of the three-dimensional shaped object, the stickiness of the surface of the three-dimensional shaped object can be suppressed, and also the initial strength of the three-dimensional shaped object can be improved.

Examples of the light energy ray to be used in manufacturing of the three-dimensional shaped object include ultraviolet rays, electron beams, X-rays, and radiation. In particular, from the economical viewpoint, ultraviolet rays having a wavelength of 300 nm or more and 450 nm or less may be used. As the light source generating ultraviolet rays, an ultraviolet laser (such as an Ar laser and a He—Cd laser), a mercury lamp, a xenon lamp, a halogen lamp, a fluorescent lamp, and so on can be used. In particular, a laser light source may be adopted because it has an excellent light condensing property and can shorten the shaping time by increasing the energy level and can obtain high shaping precision.

When a cured layer with a predetermined shape pattern is formed by irradiating the surface made of the curable resin composition with an active energy ray, the resin can be cured by a sketch system or a line drawing system using a light energy ray narrowed into dots or lines. Alternatively, the resin may be cured by irradiating the surface with an active energy ray through a planar drawing mask formed by arranging a plurality of micro-optical shutters such as liquid crystal shutters or digital micromirror shutters.

Similarly, shaping may be performed by a regulated liquid surface method. The stereolithography apparatus to be used in the regulated liquid surface method has a structure in which the stage 12 of the stereolithography apparatus 100 in FIG. 2 is provided so as to lift the shaped object above the liquid surface and a light irradiation means is provided below the tank 11. A typical example of shaping by the regulated liquid surface method is as follows. First, the supporting surface of a support stage provided so as to be able to rise and descend freely and the bottom surface of the tank accommodating the curable resin composition are placed with a predetermined distance therebetween, and a curable resin composition is supplied between the supporting surface of the support stage and the bottom surface of the tank. Subsequently, the curable resin composition between the stage supporting surface and the bottom surface is irradiated selectively with light according to slice date from the bottom surface side of the tank accommodating the curable resin composition by a laser light source or a projector. By irradiation with light, the curable resin composition between the stage supporting surface and the bottom surface of the tank is cured to form a cured resin layer in a solid state. Subsequently, the support stage is raised, and the cured resin layer is peeled off from the bottom surface of the tank.

Subsequently, the height of the support stage is adjusted such that a predetermined distance between the cured layer formed on the support stage and the bottom surface of the tank is obtained. By selective irradiation with light as in above, a new cured resin layer that is unified with the cured resin layer previously formed between the cured resin layer and the bottom surface of the tank is formed. This step is repeated a predetermined number of times with or without changing the pattern to be irradiated with light to shape a three-dimensional shaped object composed of a plurality of cured resin layers laminated integrally.

EXAMPLES

The embodiments will now be described in detail by Examples but are not limited to the Examples.

Used Material

Materials used in Examples and Comparative Examples are listed below.

Multifunctional Urethane (Meth)Acrylate Oligomer (a1)

TABLE 3

| | Compound | Weight-average molecular weight [$\times 10^3$] | Number of radical polymerizable functional group | Radical polymerizable functional group equivalent [g/eq] |
|---|---|---|---|---|
| a1-1 | Bifunctional polycarbonate urethane acrylate "CN9001NS" (manufactured by Arkema) | 5.4 | 2 | 1200 |
| a1-2 | Bifunctional polyether urethane acrylate "KAYARADUX-6101" (manufactured by Nippon Kayaku Co., Ltd.) | 6.7 | 2 | 970 |

Compound a1-1 has a structure represented by the general formula (i), and $R_1$ has "—$(CH_2)_m$— (m=6)". The radical polymerizable functional group equivalents of the compounds a1-1 and a1-2 were calculated by (number-average molecular weight)/(number of radical polymerizable functional groups).

Number-Average Molecular Weight and Weight-Average Molecular Weight

The number-average molecular weight and weight-average molecular weight of the multifunctional urethane (meth) acrylate oligomer (a1) were measured with two columns: Shodex GPC LF-804 (molecular weight exclusion limit: $2\times10^6$, separation range: 300 to $2\times10^6$, manufactured by Resonac Corporation) connected in series in a gel permeation chromatography (GPC) apparatus (HLC-8220GPC, manufactured by TOSOH Corporation) at 40° C. using THE as an eluent by an RI (refractive index, differential refractive index) detector. The obtained number-average molecular weight and weight-average molecular weight are standard polystyrene conversion values.

Multifunctional Radical Polymerizable Compound (a2) Satisfying Expressions (1) to (3)

TABLE 4

| | Compound | Molecular weight | log (S) | δP value | Radical polymerizable functional group equivalent [g/eq] |
|---|---|---|---|---|---|
| a2-1 | Neopentyl glycol diacrylate "Light Acrylate NP-A" (manufactured by Kyoeisha Chemical Co., Ltd.) | 240.30 | −0.59 | 3.5 | 120.15 |
| a2-2 | 1,6-Hexanediol diacrylate (manufactured by Kishida Chemical Co., Ltd.) | 226.27 | −2.01 | 3.9 | 113.14 |

Multifunctional radical polymerizable compound other than a1 and a2

TABLE 5

| | Compound | Molecular weight | log (S) | δP value | Radical polymerizable functional group equivalent [g/eq] |
|---|---|---|---|---|---|
| a3-1 | Tris-(2-acryloxyethyl) isocyanurate "A-9300" (manufactured by Shin-Nakamura Chemical Co., Ltd.) | 423.38 | 0.11 | 6.4 | 141 |
| a3-2 | Polycarbonate diol diacrylate "UM-90(1/3)DA" (manufactured by Ube Corporation | about 900 | −11.1 (Estimated value) | 5.2 (Estimated value) | 610 |

The radical polymerizable functional group equivalent of a compound a3-2 was calculated by (number-average molecular weight)/(number of radical polymerizable functional groups). The number-average molecular weight was measured by the same method as in the multifunctional urethane (meth)acrylate oligomer (a1).

Monofunctional Radical Polymerizable Compound (b1) Satisfying Expressions (1) to (3)

TABLE 6

| | Compound | Molecular weight | log (S) | δP value |
|---|---|---|---|---|
| b1-1 | Methyl 2-(allyloxymethyl)acrylate "AO-MA" (manufactured by Nippon Shokubai Co., Ltd.) | 156.18 | −0.11 | 4.7 |
| b1-2 | n-Butyl acrylate (manufactured by Tokyo Chemical Industry Co., Ltd.) | 128.17 | −0.54 | 4.2 |
| b1-3 | Methyl methacrylate (manufactured by Tokyo Chemical Industry Co., Ltd.) | 100.12 | 0.26 | 5.3 |
| b1-4 | Tetrahydrofurfuryl acrylate "Viscoat#150" (manufactured by Osaka Organic Chemical Industry Ltd.) | 156.18 | 0.28 | 5.6 |

TABLE 6-continued

| | Compound | Molecular weight | log (S) | δP value |
|---|---|---|---|---|
| b1-5 | Benzyl acrylate "Viscoat#160" (manufactured by Osaka Organic Chemical Industry Ltd.) | 162.19 | −1.08 | 3.9 |

Monofunctional Radical Polymerizable Compound (b2) Satisfying Expression (4)

TABLE 7

| | Compound | Molecular weight | log (S) | δP value |
|---|---|---|---|---|
| b2-1 | Acryloyl morpholine "ACMO" (manufactured by kj Chemicals Corporation) | 141.17 | 1.38 | 11.2 |
| b2-2 | N-Vinyl-ε-caprolactam (manufactured by Tokyo Chemical Industry Co., Ltd.) | 139.20 | 0.71 | 5.6 |
| b2-3 | Vinyl methyl oxazolidinone "VMOX" (manufactured by BASF) | 113.12 | 2.00 | 11.1 |

Monofunctional radical polymerizable compound other than b1 and b2

TABLE 8

| | Compound | Molecular weight | log (S) | δP value |
|---|---|---|---|---|
| b3-1 | Isobornyl acrylate (manufactured by Tokyo Chemical Industry Co., Ltd.) | 208.30 | −1.44 | 2.5 |
| b3-2 | 3,3,5-Trimethylcyclohexyl acrylate "Viscoat#196" (manufactured by Osaka Organic Chemical Industry Ltd.) | 196.29 | −1.63 | 2.6 |
| b3-3 | γ-Butyrolactone acrylate "GBLA" (manufactured by Osaka Organic Chemical Industry Ltd.) | 156.14 | −0.3 | 9.6 |
| b3-4 | Diacetone acrylamide "DAAM" (manufactured by kj Chemicals Corporation) | 169.22 | 0.35 | 11.2 |
| b3-5 | N-Phenylmaleimide "IMILEX-P" (manufactured by Nippon Shokubai Co., Ltd.) | 173.16 | −1.83 | 7.1 |
| b3-6 | N-Cyclohexylmaleimide "IMILEX-P" (manufactured by Nippon Shokubai Co., Ltd.) | 179.22 | −1.60 | 6.4 |
| b3-7 | N-Vinyl phthalimide (manufactured by Tokyo Chemical Industry Co., Ltd.) | 173.17 | −1.42 | 7.5 |

Rubber Particle (C)

C-1: KaneAce M-511 (manufactured by Kaneka Corporation): rubber particle having a core-shell structure consisting of a core made of a cross-linked butadiene rubber and a shell made of methyl polymethacrylate, average particle size: 0.23 μm.

Radical Polymerization Initiator (D)

D-1: photo radical polymerization initiator, "Omnirad 819" (manufactured by IGM Resins B.V.)

Manufacturing Curable Resin Composition

The respective materials were combined at compound ratios shown in Tables 9 and 10 and mixed until homogeneous to obtain curable resin compositions according to Examples 1 to 15 and Comparative Examples 1 to 14.

Production of Test Piece

Curable products were produced from the prepared curable resin compositions by the following method.

First, a mold with a length of 80 mm, a width of 10 mm, and thickness of 4 mm was placed between two pieces of quartz glass, and a curable resin composition was poured thereinto. The poured curable resin composition was irradiated with ultraviolet rays of 5 $mW/cm^2$ from both sides of the mold alternately twice for 180 seconds each with an ultraviolet ray irradiation device (manufactured by HOYA CANDEO OPTRONICS Corporation, trade name: LIGHT SOURCE EXECURE 3000). The obtained cured product was processed using a post-curing device (manufactured by Formlabs, trade name: Form Cure) at 70° C. for 2 hours to obtain a test piece with a length of 80 mm, a width of 10 mm and a thickness of 4 mm.

Evaluation

Methods for evaluating the curable resin compositions and cured products will now be described. The obtained results are shown in Tables 9 and 10.

Viscosity of Curable Resin Composition

The viscosity of a curable resin composition was measured by a rotational rheometer method. Specifically, a viscoelasticity measuring device (Physica MCR302, manufactured by Anton Paar GmbH) was used, and measurement was performed as follows.

A measuring device equipped with a cone plate-type measuring jig (CP25-2, manufactured by Anton Paar GmbH, 25-mm diameter, 2°) was filled with about 0.5 mL of a sample and was adjusted to 25° C. Measurement was performed under a constant shear velocity of 50 $s^{-1}$ at a data interval of 6 seconds, and the value at 120 seconds was defined as the viscosity. The viscosity was evaluated by the following criteria:

A (very good): a viscosity of less than 1.0 Pa·s;

B (good): a viscosity of 1.0 Pa·s or more and 2.2 Pa·s or less; and

C (bad): a viscosity of higher than 2.2 Pa·s.

Charpy Impact Strength]

A notch of 45° with a depth of 2 mm was formed in the center area of a test piece in accordance with JIS K 7111 using a notcher (manufactured by Toyo Seiki Seisaku-sho, Ltd., trade name: Notching Tool A-4). The test piece was broken from the rear surface of the notch with an energy of 2 J using an impact tester (manufactured by Toyo Seiki Seisaku-sho, Ltd., trade name: IMPACT TESTER IT). The energy required for the breakage was calculated from the angle to which the hammer, which was swung up to 150°, swung up after the breakage of the test piece, and was defined as the Charpy impact strength and used as an indicator of impact resistance. The impact resistance was evaluated by the following criteria:

A (very good): a Charpy impact strength of 8.5 $kJ/m^2$ or more;

B (good): a Charpy impact strength of 6.0 $kJ/m^2$ or more and less than 8.5 $kJ/m^2$; and C (bad): a Charpy impact strength of less than 6.0 $kJ/m^2$.

Water Absorption Rate

The weight of a test piece measured after drying at 50° C. for 24 hours was defined as M1 (g), and the weight of the test piece measured after immersed and left in water of 300 mL or more at room temperature for 24 hours and then wiping off the moisture on its surface was defined as M2 (g), and the water absorption rate was calculated by applying them to the following expression:

$$\text{Water absorption rate [\%]} = (M2 - M1)/M1 \times 100.$$

The water absorption rate was evaluated by the following criteria:

A (very good): a water absorption rate of less than 1.0%;

B (good): a water absorption rate of 1.0% or more and less than 5%; and

C (bad): a water absorption rate of 5% or more.

TABLE 9

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Multifunctional radical polymerizable compound (parts by mass) | a1 | a1-1 | 37.5 | 37.5 | 37.5 | 37.5 | 37.5 | 37.5 | 37.5 | — | 37.5 | 37.5 |
| | | a1-2 | — | — | — | — | — | — | — | 37.5 | — | — |
| | a2 | a2-1 | — | — | — | — | — | 5.0 | — | — | — | — |
| | | a2-2 | — | — | — | — | — | — | 5.0 | — | — | — |
| | a3 | a3-1 | 7.5 | 7.5 | 7.5 | 7.5 | 7.5 | 7.5 | 7.5 | 7.5 | 7.5 | 7.5 |
| | | a3-2 | — | — | — | — | — | — | — | — | — | — |
| Monofunctional radical polymerizable compound (parts by mass) | b1 | b1-1 | 5.0 | — | — | — | — | — | — | 5.0 | 5.0 | 5.0 |
| | | b1-2 | — | 5.0 | — | — | — | — | — | — | — | — |
| | | b1-3 | — | — | 5.0 | — | — | — | — | — | — | — |
| | | b1-4 | — | — | — | 5.0 | — | — | — | — | — | — |
| | | b1-5 | — | — | — | — | 5.0 | — | — | — | — | — |
| | b2 | b2-1 | 35.0 | 35.0 | 35.0 | 35.0 | 35.0 | 35.0 | 35.0 | 35.0 | — | — |
| | | b2-2 | — | — | — | — | — | — | — | — | 35.0 | — |
| | | b2-3 | — | — | — | — | — | — | — | — | — | 35.0 |
| | b3 | b3-1 | 15.0 | 15.0 | 15.0 | 15.0 | 15.0 | 15.0 | 15.0 | 15.0 | 15.0 | 15.0 |
| | | b3-2 | — | — | — | — | — | — | — | — | — | — |
| | | b3-3 | — | — | — | — | — | — | — | — | — | — |
| | | b3-4 | — | — | — | — | — | — | — | — | — | — |
| | | b3-5 | — | — | — | — | — | — | — | — | — | — |
| | | b3-6 | — | — | — | — | — | — | — | — | — | — |
| | | b3-7 | — | — | — | — | — | — | — | — | — | — |
| Rubber particle (parts by mass) | | C-1 | 8.7 | 8.7 | 8.7 | 8.7 | 8.7 | 8.7 | 8.7 | 8.7 | 8.7 | 8.7 |
| Radical polymerization initiator (parts by mass) | | D-1 | 1.0 | 1.0 | 1.0 | 1.0 | 1.0 | 1.0 | 1.0 | 1.0 | 1.0 | 1.0 |
| N-vinyl group content (mol %) | | | — | — | — | — | — | — | — | — | 53.9 | 63.7 |
| Methacrylate group content (mol %) | | | 6.9 | — | 10.4 | — | — | — | — | 6.7 | 6.9 | 6.5 |
| Composition viscosity | Measured value (Pa · s) | | 1.7 | 1.7 | 1.5 | 1.9 | 2.0 | 2.0 | 2.0 | 1.4 | 1.5 | 1.2 |

TABLE 9-continued

| | | | | | | | | | | | |
|---|---|---|---|---|---|---|---|---|---|---|---|
| | Evaluation | B | B | B | B | B | B | B | B | B | B |
| Charpy impact strength | Measured value (kJ/m2) | 8.7 | 8.2 | 8.0 | 7.8 | 7.6 | 7.2 | 7.0 | 9.2 | 9.0 | 8.7 |
| | Evaluation | A | B | B | B | B | B | B | A | A | A |
| Water absorption rate | Measured value (%) | 1.0 | 0.9 | 1.2 | 1.2 | 0.9 | 0.8 | 0.9 | 1.4 | 0.7 | 0.8 |
| | Evaluation | B | A | B | B | A | A | A | B | A | A |

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Multifunctional radical polymerizable compound (parts by mass) | a1 | a1-1 | 37.5 | 37.5 | 37.5 | 37.5 | 37.5 | 37.5 | 37.5 | 37.5 | 37.5 |
| | | a1-2 | — | — | — | — | — | — | — | — | — |
| | a2 | a2-1 | — | — | — | — | — | — | — | — | — |
| | | a2-2 | — | — | — | — | — | — | — | — | — |
| | a3 | a3-1 | 7.5 | 7.5 | 7.5 | 7.5 | 7.5 | 7.5 | 7.5 | 7.5 | 7.5 |
| | | a3-2 | — | — | — | — | — | — | — | 5.0 | — |
| Monofunctional radical polymerizable compound (parts by mass) | b1 | b1-1 | — | — | — | — | — | — | — | — | — |
| | | b1-2 | — | — | — | — | — | — | — | — | — |
| | | b1-3 | — | — | — | — | — | — | — | — | — |
| | | b1-4 | — | — | — | — | — | — | — | — | — |
| | | b1-5 | — | — | — | — | — | — | — | — | — |
| | b2 | b2-1 | 35.0 | 35.0 | 35.0 | 35.0 | 35.0 | 35.0 | 35.0 | 35.0 | 40.0 |
| | | b2-2 | — | — | — | — | — | — | — | — | — |
| | | b2-3 | — | — | — | — | — | — | — | — | — |
| | b3 | b3-1 | 20.0 | 15.0 | 15.0 | 15.0 | 15.0 | 15.0 | 15.0 | 15.0 | 15.0 |
| | | b3-2 | — | 5.0 | — | — | — | — | — | — | — |
| | | b3-3 | — | — | 5.0 | — | — | — | — | — | — |
| | | b3-4 | — | — | — | 5.0 | — | — | — | — | — |
| | | b3-5 | — | — | — | — | 5.0 | — | — | — | — |
| | | b3-6 | — | — | — | — | — | 5.0 | — | — | — |
| | | b3-7 | — | — | — | — | — | — | 5.0 | — | — |
| Rubber particle (parts by mass) | | C-1 | 8.7 | 8.7 | 8.7 | 8.7 | 8.7 | 8.7 | 8.7 | 8.7 | 8.7 |
| Radical polymerization initiator (parts by mass) | | D-1 | 1.0 | 1.0 | 1.0 | 1.0 | 1.0 | 1.0 | 1.0 | 1.0 | 1.0 |
| N-vinyl group content (mol %) | | | — | — | — | — | — | — | 7.9 | — | — |
| Methacrylate group content (mol %) | | | — | — | — | — | — | — | — | — | — |
| Composition viscosity | Measured value (Pa · s) | | 2.5 | 2.4 | 2.7 | 2.4 | 2.5 | 2.4 | 2.7 | 2.8 | 2.3 |
| | Evaluation | | C | C | C | C | C | C | C | C | C |
| Charpy impact strength | Measured value (kJ/m2) | | 7.0 | 8.0 | 8.5 | 7.2 | 7.0 | 7.1 | 8.5 | 9.0 | 7.2 |
| | Evaluation | | B | B | A | B | B | B | A | A | B |
| Water absorption rate | Measured value (%) | | 0.7 | 0.9 | 0.9 | 1.4 | 0.8 | 0.9 | 0.8 | 0.8 | 1.6 |
| | Evaluation | | A | A | A | B | A | A | A | A | B |

TABLE 10

| | | | Example | | | | | Comparative Example | | | | |
|---|---|---|---|---|---|---|---|---|---|---|---|---|
| | | | 11 | 12 | 13 | 14 | 15 | 10 | 11 | 12 | 13 | 14 |
| Multifunctional radical polymerizable compound (parts by mass) | a1 | a1-1 | 60.0 | 30.0 | 25.0 | 37.5 | 35.0 | 60.0 | 30.0 | 25.0 | 20.0 | 20.0 |
| | | a1-2 | — | — | — | — | — | — | — | — | — | — |
| | a2 | a2-1 | — | — | — | — | — | — | — | — | — | — |
| | | a2-2 | — | — | — | — | — | — | — | — | — | — |
| | a3 | a3-1 | — | 10.0 | 10.0 | 7.5 | 20.0 | — | 10.0 | 10.0 | 10.0 | 10.0 |
| | | a3-2 | — | — | — | — | — | — | — | — | — | — |
| Monofunctional radical polymerizable compound (parts by mass) | b1 | b1-1 | 30.0 | 10.0 | 10.0 | 5.0 | 10.0 | — | — | — | — | 10.0 |
| | | b1-2 | — | — | — | — | — | — | — | — | — | — |
| | | b1-3 | — | — | — | — | — | — | — | — | — | — |
| | | b1-4 | — | — | — | — | — | — | — | — | — | — |
| | | b1-5 | — | — | — | — | — | — | — | — | — | — |
| | b2 | b2-1 | 10.0 | 35.0 | 35.0 | 45.0 | 35.0 | 10.0 | 35.0 | 35.0 | 35.0 | 35.0 |
| | | b2-2 | — | — | — | — | — | — | — | — | — | — |
| | b3 | b3-1 | — | 15.0 | 20.0 | — | — | 30.0 | 25.0 | 30.0 | 35.0 | 25.0 |

TABLE 10-continued

| | | Example | | | | | Comparative Example | | | | |
|---|---|---|---|---|---|---|---|---|---|---|---|
| | | 11 | 12 | 13 | 14 | 15 | 10 | 11 | 12 | 13 | 14 |
| | b3-2 | — | — | — | — | — | — | — | — | — | — |
| | b3-3 | — | — | — | — | — | — | — | — | — | — |
| | b3-4 | — | — | — | 5.0 | — | — | — | — | — | — |
| | b3-5 | — | — | — | — | — | — | — | — | — | — |
| | b3-6 | — | — | — | — | — | — | — | — | — | — |
| | b3-7 | — | — | — | — | — | — | — | — | — | — |
| Rubber particle (parts by mass) | C-1 | 2.0 | 20.0 | 20.0 | 8.7 | 11.1 | 2.0 | 20.0 | 20.0 | 20.0 | 20.0 |
| Radical polymerization initiator (parts by mass) | D-1 | 1.0 | 1.0 | 1.0 | 1.0 | 1.0 | 1.0 | 1.0 | 1.0 | 1.0 | 1.0 |
| N-vinyl group content (mol %) | | — | — | — | — | — | — | — | — | — | — |
| Methacrylate group content (mol %) | | 54.1 | 12.8 | 12.4 | 6.9 | 13.2 | — | — | — | — | 13.6 |
| Composition viscosity | Measured value (Pa · s) | 1.6 | 2.0 | 1.3 | 1.7 | 1.5 | 4.8 | 3.6 | 2.3 | 1.3 | 0.9 |
| | Evaluation | B | B | B | B | B | C | C | C | B | A |
| Charpy impact strength | Measured value (kJ/m2) | 11.2 | 7.8 | 6.2 | 8.6 | 6.8 | 8.6 | 7.2 | 5.1 | 1.6 | 2.5 |
| | Evaluation | A | B | B | A | B | A | B | C | C | C |
| Water absorption rate | Measured value (%) | 0.8 | 1.1 | 1.0 | 4.1 | 1.4 | 0.5 | 0.9 | 0.8 | 0.7 | 0.8 |
| | Evaluation | A | B | B | B | B | A | A | A | A | A |

As shown in Table 9, the curable resin compositions containing a radical polymerizable compound satisfying the expressions (1) to (3) (compound (a2) or compound (b1)) prepared in Examples 1 to 10 had a viscosity in a range suitable as a shaping material to be used in stereolithography. The obtained cured products had excellent impact resistance and a low water absorption rate to exhibit excellent dimensional stability. In contrast, the cured products of Comparative Examples 1 to 9 obtained from curable resin compositions not containing a radical polymerizable compound satisfying the expressions (1) to (3) had significantly high viscosity which makes shaping by stereolithography difficult.

In the results shown in Table 9, a relationship between the δP values of the radical polymerizable compounds (b1-1 to b1-5 and b3-1 to b3-7) satisfying the expressions (1) and (3) and the viscosity of the curable resin compositions is shown in FIG. 1 (Examples 1 to 5 and Comparative Examples 1 to 7). As shown in FIG. 1, it was observed that the curable resin compositions (Examples) containing the compounds (b1-1 to b1-5) satisfying the expression (2) tend to have significantly low viscosity compared to curable resin compositions (Comparative Examples) containing the compounds (b3-1 to b3-7) not satisfying the expression (2). Specifically, the viscosity of a resin composition showed a tendency to have a minimum value around the δP value of 5.0 and gradually increase as the δP value deviated from the above value, and in &P value ranges or less than 3.0 and of higher than 6.0, a high level of viscosity that made shaping by stereolithography difficult was observed. That is, it was revealed that when a radical polymerizable compound satisfying the expressions (1) to (3) is added to a resin composition, it is possible to provide a curable resin composition that has low viscosity capable of forming a cured product with excellent impact resistance and low water absorbency and can be suitably used in three-dimensional shaping.

As shown in Table 10, in curable resin compositions in which the content of the compound (a1) is less than 25 parts by mass, the viscosity-decreasing effect by addition of a radical polymerizable compound satisfying the expressions (1) to (3) was almost not observed, and the Charpy impact strength of the cured product was very low (Comparative Examples 13 and 14). In contrast, in the curable resin composition in which the content of the compound (a1) is 25 parts by mass or more, the viscosity-decreasing effect by addition of a radical polymerizable compound satisfying the expressions (1) to (3) tended to increase, and at the same time, cured products having high Charpy impact strength and low water absorption rates were obtained (Examples 11 to 13 and Comparative Examples 10 to 12). That is, it was revealed that when the content of the multifunctional urethane (meth)acrylate oligomer (a1) is 25 parts by mass or more, a curable resin composition having low viscosity that can form a cured product having excellent impact resistance and low water absorbency and can be suitably used in three-dimensional shaping can be provided by adding a radical polymerizable compound satisfying the expressions (1) to (3) to the composition.

From the results above, according to the present disclosure, it was confirmed that a curable resin composition having viscosity suitable for stereolithography is obtained and a cured product having good impact resistance and a low water absorption rate is obtained by curing the composition.

According to the present disclosure, it is possible to provide a curable resin composition having low viscosity suitable for three-dimensional shaping to form a cured product having excellent impact resistance and low water absorbency.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-081020 filed May 16, 2023 and Japanese Patent Application No. 2024-071465 filed Apr. 25, 2024, which are hereby incorporated by reference herein in their entirety.

What is claimed is:

1. A curable resin composition comprising:

a multifunctional radical polymerizable compound (A);

a monofunctional radical polymerizable compound (B);

a rubber particle (C); and a radical polymerization initiator (D), wherein the multifunctional radical polymerizable compound (A) includes a multifunctional urethane (meth)acrylate oligomer (a1) in an amount of 25 parts by mass or more and 60 parts by mass or less based on 100 parts by mass of the total amount of the multifunctional radical polymerizable compound (A) and the monofunctional radical polymerizable compound (B), at least one of the multifunctional radical polymerizable compound (A) or the monofunctional radical polymerizable compound (B) contains at least one radical polymerizable compound satisfying expressions (1) to (3) below in an amount of 2 parts by mass or more and 75 parts by mass or less based on 100 parts by mass of the total amount of the multifunctional radical polymerizable compound (A) and the monofunctional radical polymerizable compound (B), and the radical polymerizable compound satisfying the expressions (1) to (3) is a radical polymerizable compound other than the multifunctional urethane (meth) acrylate oligomer (a1):

$$\log(S) \leq 0.4 \quad (1)$$

$$3.0 \leq \delta P \text{ value} \leq 6.0 \quad (2)$$

$$\text{Molecular weight} \leq 500 \quad (3)$$

log(S) is a common logarithm of solubility in water at 25° C., and

δP value is a value of dipole interaction energy in Hansen solubility parameter, the rubber particle (C) has a core-shell structure, and a shell of the core-shell structure includes a polymer of a monofunctional radical polymerizable compound having a (meth)acryloyl group.

2. The curable resin composition according to claim 1, wherein a content of the monofunctional radical polymerizable compound (B) is 30 parts by mass or more and 75 parts by mass or less based on 100 parts by mass of the total amount of the multifunctional radical polymerizable compound (A) and the monofunctional radical polymerizable compound (B).

3. The curable resin composition according to claim 1, wherein the monofunctional radical polymerizable compound (B) contains a monofunctional radical polymerizable compound satisfying an expression (4), and a content of the monofunctional radical polymerizable compound satisfying the expression (4) is 8 parts by mass or more and 55 parts by mass or less based on 100 parts by mass of the total amount of the multifunctional radical polymerizable compound (A) and the monofunctional radical polymerizable compound (B), $$\log(S) > 0.4 \quad (4).$$

4. The curable resin composition according to claim 1, wherein the monofunctional radical polymerizable compound (B) includes at least one compound selected from the group consisting of a monofunctional acrylamide compound and an N-vinyl compound.

5. The curable resin composition according to claim 4, wherein the monofunctional acrylamide compound and the N-vinyl compound are compounds having a cyclic structure.

6. The curable resin composition according to claim 1, wherein a content of the rubber particle (C) is 2 parts by mass or more and 25 parts by mass or less based on 100 parts by mass of the total amount of the multifunctional radical polymerizable compound (A) and the monofunctional radical polymerizable compound (B).

7. The curable resin composition according to claim 1, wherein expression (2a) is satisfied:

$$3.5 \leq \delta P \text{ value} \leq 5.8. \quad (2a)$$

8. The curable resin composition according to claim 1, wherein the radical polymerizable compound satisfying the expressions (1) to (3) is a (meth)acrylate compound.

9. The curable resin composition according to claim 1, wherein the multifunctional urethane (meth)acrylate oligomer (a1) has a weight-average molecular weight of 1,000 or more and 60,000 or less.

10. The curable resin composition according to claim 1, wherein the multifunctional urethane (meth)acrylate oligomer (a1) has a structure represented by formula (i) or (ii):

(i)

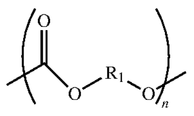

(ii)

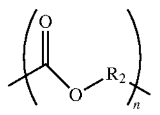

in formulae (i) and (ii), $R_1$ and $R_2$ are each independently a hydrocarbon group including an alkylene group having 1 or more and 18 or less carbon atoms, and n is 2 or more and 50 or less.

11. The curable resin composition according to claim 1, wherein the multifunctional urethane (meth)acrylate oligomer (a1) has a radical polymerizable functional group equivalent of 400 g/eq or more.

12. The curable resin composition according to claim 1, wherein the multifunctional radical polymerizable compound (A) contains a multifunctional (meth)acryloyl group-containing isocyanurate compound.

13. The curable resin composition according to claim 1, wherein a content of an N-vinyl group is 80 mol % or less based on the total amount of the radical polymerizable functional group in the curable resin composition.

14. The curable resin composition according to claim 1, wherein a content of a methacrylate group is 60 mol % or less based on the total amount of the radical polymerizable functional group in the curable resin composition.

15. A cured product made by curing the curable resin composition according to claim 1.

16. A method for manufacturing an article, comprising repeating a step of forming a cured layer by curing the curable resin composition according to claim 1 at a predetermined thickness multiple times.

17. The method for manufacturing an article according to claim 16, comprising:

a step of supplying a curable resin composition at a predetermined thickness; and a step of curing the curable resin composition by irradiation with light energy based on slice date of a three-dimensional model.

18. The method for manufacturing an article according to claim 17, further comprising:

a step of washing or post-curing the shaped object obtained by repeating the step of supplying a curable resin composition at a predetermined thickness and the step of curing the curable resin composition by irradiation with light energy multiple times.

* * * * *